(12) United States Patent
Jerding

(10) Patent No.: US 6,738,982 B1
(45) Date of Patent: May 18, 2004

(54) METHOD AND SYSTEM FOR UNIFORM RESOURCE IDENTIFICATION AND ACCESS TO TELEVISION SERVICES

(75) Inventor: Dean F. Jerding, Roswell, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/564,262

(22) Filed: May 4, 2000

(51) Int. Cl.⁷ .................. H04N 5/445; H04N 7/173; H04N 7/16; G06F 9/00; G06F 9/24; G06F 15/177
(52) U.S. Cl. .................. 725/112; 725/60; 725/61; 725/110; 725/131; 725/139; 725/51; 713/1
(58) Field of Search .................. 725/39, 44, 47, 725/51, 61, 86, 104, 109, 112; 345/760, 721; 709/236; 715/500.1, 501.1, 513; 713/1

(56) References Cited

U.S. PATENT DOCUMENTS

| | | |
|---|---|---|
| 5,488,409 A | 1/1996 | Yuen et al. .................. 725/41 |
| 5,539,920 A | 7/1996 | Menand et al. .................. 725/151 |
| 5,596,373 A | 1/1997 | White et al. .................. 348/569 |
| 5,600,364 A | 2/1997 | Hendricks et al. .................. 725/9 |
| 5,619,274 A | 4/1997 | Roop et al. .................. 348/461 |
| 5,754,258 A | 5/1998 | Hanaya et al. .................. 725/52 |
| 5,835,923 A | 11/1998 | Shibata et al. .................. 715/526 |
| 5,841,433 A | 11/1998 | Chaney .................. 725/50 |
| 5,848,352 A | 12/1998 | Dougherty et al. .................. 725/110 |
| 5,850,218 A | 12/1998 | LaJoie et al. .................. 725/45 |
| 5,883,901 A | 3/1999 | Chiu et al. .................. 370/508 |
| 5,930,231 A | 7/1999 | Miller et al. .................. 370/210 |
| 5,933,475 A | 8/1999 | Coleman .................. 379/10.01 |
| 5,953,005 A * | 9/1999 | Liu .................. 715/500.1 |
| 5,961,603 A | 10/1999 | Kunkel et al. .................. 709/229 |
| 6,002,394 A | 12/1999 | Schein et al. .................. 725/39 |
| 6,002,401 A | 12/1999 | Baker .................. 345/839 |
| 6,025,837 A * | 2/2000 | Matthews et al. .................. 345/721 |
| 6,047,129 A | 4/2000 | Frye .................. 717/172 |
| 6,049,831 A * | 4/2000 | Gardell et al. .................. 709/236 |
| 6,081,263 A * | 6/2000 | LeGall et al. .................. 345/760 |
| 6,175,362 B1 | 1/2001 | Harms et al. .................. 345/721 |
| 6,223,214 B1 | 4/2001 | Tufty et al. .................. 709/217 |
| 6,347,400 B1 | 2/2002 | Ohkura et al. .................. 725/60 |
| 6,442,755 B1 * | 8/2002 | Lemmons et al. .................. 725/47 |
| 6,460,179 B1 | 10/2002 | Kretz et al. .................. 725/37 |
| 2001/0030661 A1 * | 10/2001 | Reichardt .................. 345/721 |
| 2003/0066085 A1 * | 4/2003 | Boyer et al. .................. 725/104 |

FOREIGN PATENT DOCUMENTS

| | | |
|---|---|---|
| EP | 0837599 | 4/1998 |
| WO | WO95/15658 | 6/1995 |

OTHER PUBLICATIONS

W3C Internationalization/Localization; Apr. 29, 1997; (www.w3.org/International/O-help-lang).*
Welch, B. et al., "Prefix Tables: A Simple Mechanism for Locating Files in a Distributed System," International Conference on Distributed Computing Systems, May 1986, No. 6, pp. 184–189.

* cited by examiner

Primary Examiner—Vivek Srivastava
Assistant Examiner—Hai V. Tran

(57) ABSTRACT

The present invention provides a method and system for a DHCT coupled to a display to enable a user to access functionality of a service infrastructure of an interactive television network by a middleware markup language. In one implementation, the DHCT presents a user one or more selectable link representations in a uniform resource identifier protocol that correspond to a separate services. The DHCT receives input of a selected link representation label from one of the selectable link representations for activation of one of the services corresponding to the selected link representation label. Thereafter, the DHCT translates the selected link representation label from the uniform resource identifier protocol to an executable call and activates the interactive television application for presentation to the user by the executable call.

31 Claims, 3 Drawing Sheets

METHOD AND SYSTEM FOR UNIFORM RESOURCE IDENTIFICATION AND ACCESS TO TELEVISION SERVICES

FIELD OF THE INVENTION

This invention relates in general to the field of television systems, and more particularly, to an access scheme for accessing services in television systems.

BACKGROUND

With the recent advent of digital transmission technology, cable television systems are now capable of providing much more than the traditional analog broadcast video. In implementing enhanced programming, the digital home communication terminal ("DHCT"), otherwise known as the settop box, has become an important computing device for accessing video services and navigating a subscriber through a maze of services available.

DHCTs now support an increasing number of services which are not analog, but rather digital; are not basic broadcast, but rather two-way communication such as video-on-demand; and are not basic video, such as e-mail or web browsers. These are all in addition to the host of other television services which are increasingly being demanded by consumers, examples of which include audio and audio/visual programming, advanced navigation controls, impulse pay-per-view technology, and on-line commerce. In addition to the interactive services, the increased bandwidth available through a digital television system has made it possible for a subscriber to have access to hundreds, or even thousands, of channels and/or services. Thus, in order to provide these more powerful and complex features, the simple conventional channel abstractions need to be extended beyond those which have traditionally been provided.

With the advent of interactive television and other television enhancements, middleware layers are added to the software supporting applications in the television network in effort to increase the functionality of the DHCT. However, there is a problem in instituting the middleware languages to access the underlying application platform of the DHCT in support of the native applications on the network. There is additionally a problem in making the functionality that supports the lifestyle of an application (i.e., installation, provisioning, download, activation, suspension, and termination) available to the middleware applications. A problem also exists in combining Internet applications (and other services not traditionally associated with television) in the DHCTs so that they access the application and service management infrastructure inherent in the television environment. Implementing middleware markup languages to activate applications with limited resources in a shared resource environment of the DHCT also presents a problem that must be overcome.

SUMMARY OF THE INVENTION

Briefly described, the preferred embodiment of the present invention provides a method and system for accessing services in a television system. In one implementation, a DHCT coupled to a display enables a user to access functionality of a service infrastructure of an interactive television network by a middleware markup language. HTML-based applications execute on the DHCT and present a user one or more selectable link representations using a uniform resource identifier protocol that corresponds to separate services. An application receives input denoting a selected link label corresponding to the selected link representation. Thereafter, the middleware platform translates the associated uniform resource identifier into to an executable call and activates the corresponding by the executable call.

Many objects, features, and advantages of the present invention will become apparent to one with skill in the art upon examination of the following drawings and detailed description.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

Figure 1:
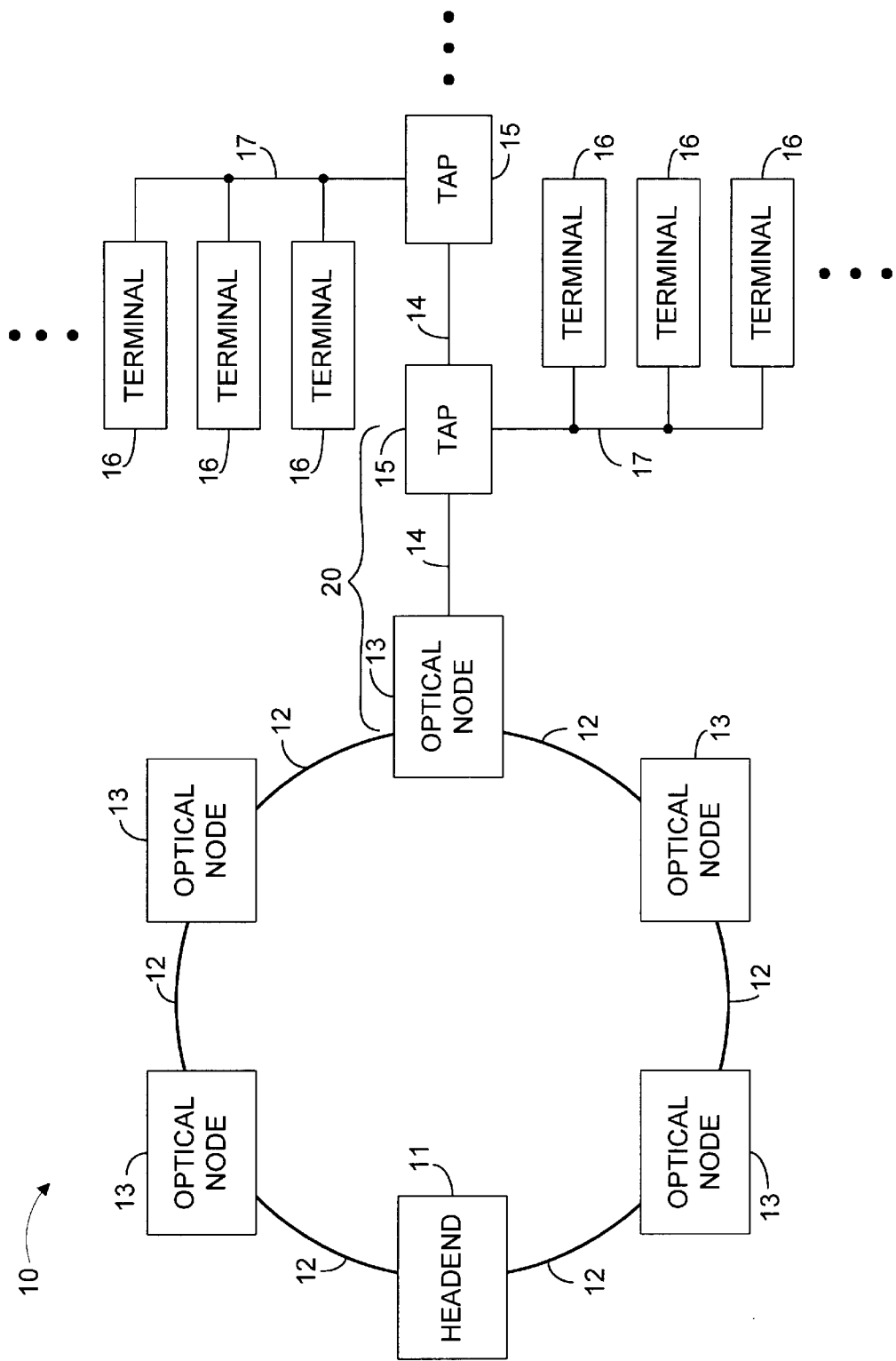
FIG. 1 is a block diagram of a cable television system in accordance with one preferred embodiment of the present invention.

FIG. 1 is a block diagram of a cable television system 10 including a headend 11 for receiving television signals, such as satellite television signals, and converting the signals into a format for transmitting the signals over the system 10. The transmitted signals can, for example, be radio frequency (RF) signals or optical signals, as shown, transmitted over fiber optic cable 12. When the optical signals are transmitted by the headend 11, one or more optical nodes 13 are included in the system 10 for converting the optical signals to RF signals that are thereafter routed over other media, such as coaxial cables 14. Taps 15 are provided within the cable system 10 for splitting the RF signal off, via cables 17, to subscriber equipment such as DHCTs 16, cable-ready television sets, video recorders, or computers. Thus, headend 11 is connected through a network 20 to multiple DHCTs 16.

Figure 2:
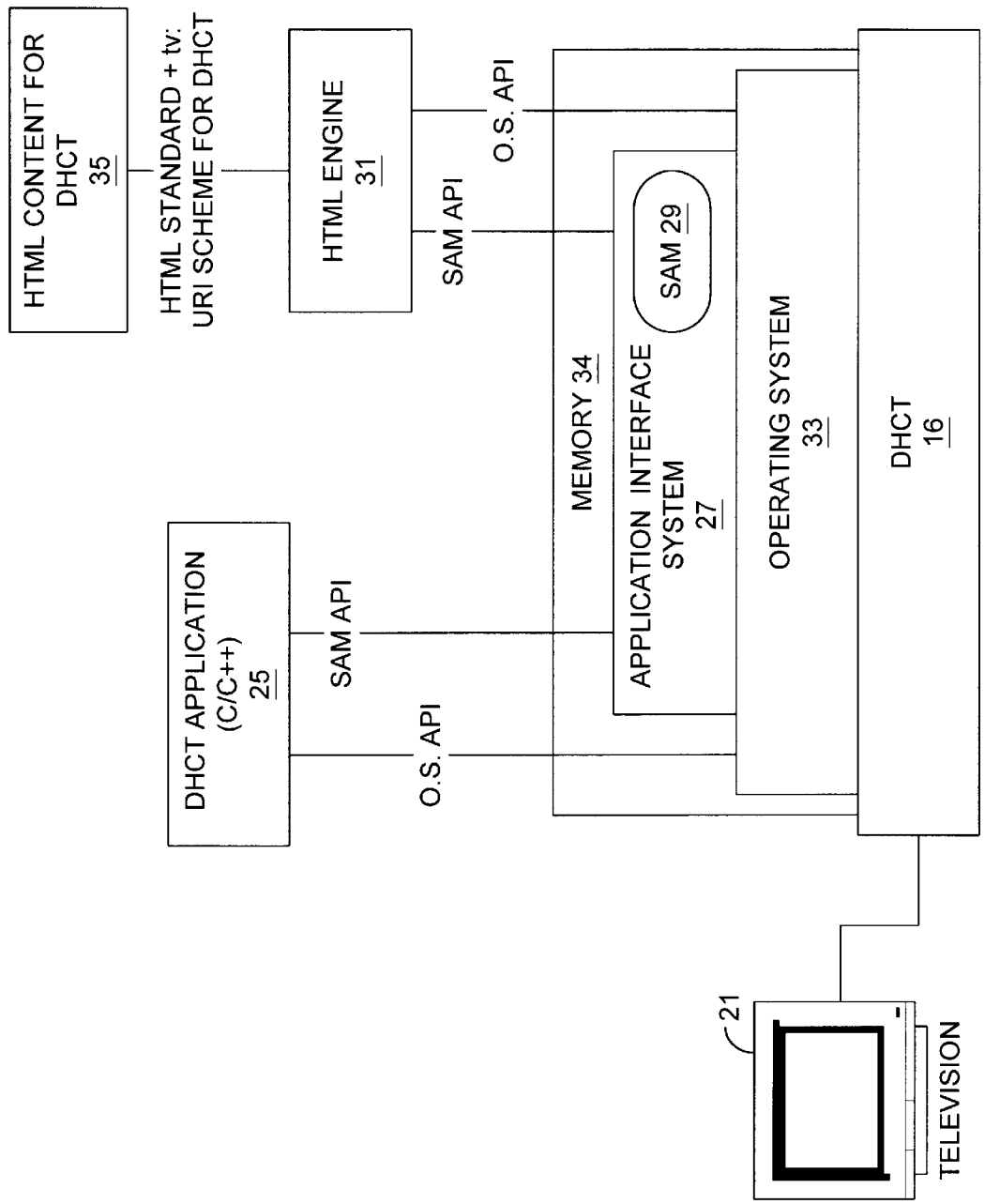
FIG. 2 is a block diagram of a television connected to a terminal depicted in FIG. 1 showing some of its components in memory that interact with middleware applications to provide access to services.

FIG. 2 is a diagram of a DHCT 16, or terminal, depicted in FIG. 1 including components in memory that interact with middleware applications to provide access to applications. The DHCT 16 is typically situated within the residence or business of a subscriber. It may be integrated into a device that has a display 21, such as a television set, or it may be a stand-alone unit that couples to an external display 21, such as a display included with a computer or a television, and that processes media transported in television signals for presentation or playback to a subscriber (user of the DHCT). The DHCT 16 preferably comprises a communications interface (not shown) for receiving the RF signals, which can include media such as video, audio, graphical and data information, from the tap 15 and for providing any reverse information to the tap 15 for transmission back to the headend 11 (FIG. 1). The subscriber inputs may, for example, be provided by a computer or transmitter with buttons or keys located either on the exterior of the terminal or by a hand-held remote control device or keyboard (not shown) that includes subscriber-actuated buttons.

Basic functionality of the DHCT 16 is provided by an operating system 23 that is contained in memory 34. The operating system 23 is designed specifically for developing and delivering multimedia over broadcast and interactive networks and uses an open and modular platform for flexibility and customization. The operating system 23 has multitasking and real-time multimedia delivery capability.

The application interface system (AIS) 27 (also called the platform), contained in memory 34, is a collection of end-to-end software interfaces enabling applications on the cable televisions system network 10. The AIS 27 is a layer of application and service management software components that an application must utilize to exist in the cable television system network 10. It also consists of resource access and management components to abstract the network functionality in the cable television system network 10 such as a broadcast file system, IP Gateway, and an Emergency Alert System (none of these items are shown but are merely non-limiting examples).

The service application manager (SAM) 29 is a component of the platform 27 that provides a model in which the subscriber can access services available on the system. A service consists of an application to run and a parameter, such as data content, specific to that service. The SAM 29 handles the lifecycle of the applications on the system, including the definition, initiation, activation, suspension and deletion of services they provide and the downloading of the application into the DHCT 16 as necessary. Many services can be defined using the same application component with different parameters. As a non-limiting example, an application to tune video programming could be executed with one set of parameters to view HBO and a separate set of parameters to view CNN. Each association of the application component (tune video) and one parameter component (HBO or CNN) represent a particular service that has a unique service ID.

One or more programmed software application clients 25 are executed by utilizing the computing resources in the DHCT 16. An application client 25, herein referred to as application, is the portion of an application that executes on the DHCT 16 and provides the service of the application to the subscriber typically through a graphical user interface. The applications 25 are typically composed in C or C++ programming language, but could be composed in any of a variety of programming languages. In at least one embodiment, applications that can be activated and/or executed include a watch TV application, a pay-per-view application, a video-on-demand application, and a digital music aplication.

The applications 25 are top level software entities on the network for providing services to the subscriber. In one implementation, all applications 25 executing on the DHCT 16 must abide by several guidelines. First, an application 25 must utilize and implement SAM 29 for provisioning, activation, and suspension of services. Second, an application 25 must share DHCT 16 resources with other applications and abide by the resource management policies of the SAM 29, the operating system 23, and the DHCT 16. Third, an application 25 must handle all situations where resources are unavailable. Fourth, when an application 25 loses service authorization while providing a service, the application 25 should suspend the service. Finally, an application 25 must be configured so it does not have access to certain user subscriber input keys that are reserved by certain resident (or native) applications (i.e., power, channel+/−, volume+/−, etc.).

Some applications are composed in middleware markup languages such as hypertext markup language (HTML) or other extensible markup languages (XML), and during execution they provide an interface as a mechanism to access to the functionality of the service infrastructure of the DHCT 16. The interface of these middleware applications includes HTML (or XML) content in the display with selectable link labels that enable the user to activate other services supported by the DHCT 16.

A service that may be activated includes any native application resident on the DHCT 16, any downloadable application supported by the cable television provider at the headend 11, any Internet web content, or any other information source provided by the cable television system. The interface implements a uniform resource identifier (URI) protocol that treats interactive television applications and services as configurable resources. Thus, services supported by SAM 29 are included directly as objects in a document or hyperlink definition to the services contained in the document.

To render HTML content to the user, the middleware applications access an HTML engine 31. The HTML engine 31 is a non-limiting example of a middleware engine that is the link between the middleware language and the SAM application programming interface (API) for service management on the DHCT 16. It is understood that the HTML engine 31 could be an XML engine or engine for any other middleware markup language implemented by the DHCT 16. The HTML engine 31 renders HTML content based on standard HTML content tags plus the URI o scheme in presenting a graphical user interface to the user. The HTML engine 31 also receives user input denoting selection of a hyperlink label and if necessary translates the URI scheme into the necessary API call to activate the target television or other service supported by the DHCT 16.

Figure 3:
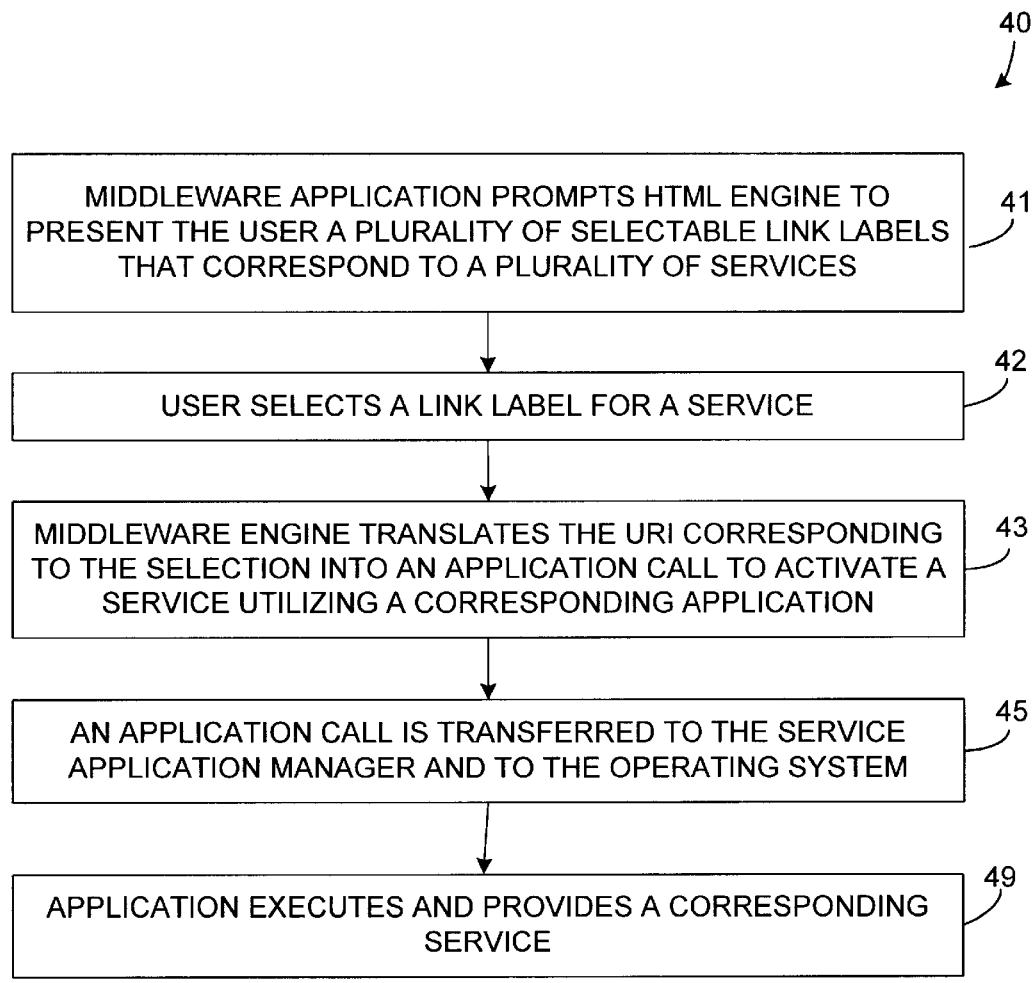
FIG. 3 is a flowchart diagram of the process that enables a user to select one or more link representations presented by middleware applications for activation of other native applications resident in the DHCT depicted in FIG. 2.

With additional reference to FIG. 3, the DHCT 16 provides HTML content 35 and implements applications and services according to user selection of HTML selectable link labels, or representations, as shown in process 40. The selectable link label is only one type of link representation that may be displayed to the user by the DHCT 16. Moreover, a link label may be displayed as text only, text plus a graphical icon, or a graphical icon only. The selectable link labels are rendered based upon HTML (or XML) hyperlink definitions. The link definitions are comprised of an anchor <A> to define the start and destination of the hypertext link definition, and the text between the start and an end tag defines the label for the link definition. The label can include graphics defined with IMG elements. One example link definition expressed in HTML includes the following syntax: <A HREF="tv://destination service"><IMG SRC="graphic label.jpg">text label</A>. In this example, "tv://destination service" is the destination definition (also referred to herein as a destination address, destination reference, service reference or universal resource identifier) and "<IMG SRC="graphic label.jpg">text label" is the label definition (also referred to herein as one type of link representation definition or label reference). Also in this example, the label definition includes an IMG element and text, both of which will be used to generate visual representations that are selectable by the user. The IMG element further defines file addresses.

A middleware application that includes HTML content 35 implements the HTML engine 31 to present a user a plurality of selectable link labels that correspond to a plurality of services, as described in step 41. In at least one embodiment, the plurality of services comprises all applications, channels, and services supported by a television server device coupled to the DHCT 16. The HTML rendering application receives the user input selection, as shown in step 42, of one of the plurality of HTML selectable link labels available for selection on display 21. The selected link label corresponds through the underlying link definition to another application 25 supported by the DHCT 16. Thereafter, the HTML engine 31 translates the URI in the HTML protocol (or other implemented protocol) into a C-based API call, for example, for the SAM 29 and the operating system 23, as described in step 43. In step 45, an application call is transferred to the SAM 29 and to the operating system 23. The SAM 29 and the operating system 23 receive their API calls that are then transferred to the desired application 25. Thereafter, the application 25 executes and presents the designated service to the user on the display 21, as depicted in step 49, in compliance with any limitations instructed by the link definition for the selected link label.

The syntax or grammar for the new uniform resource identifier (URI) scheme described above is defined in more detail below, using the "tv:" label:

TvURI:="tv:" tvId [parameterList]
tvId:=callLetters|networkId|serviceId
callLetters:=[alpha |digit|]+
networkId:=[alpha|digit]+
serviceId:="//" tuningSpace "/" id
tuningSpace:="ntsc"|"pal"|atscSpace
    |"service"|"channel"|"application"
astcSpace:="atsc/"["vcn"|"sourceid"]
id:=[digit|alpha]+
parameterList:=[";" parameter ]*
parameter:=env|appURL|appParameter
env:="env="[screenMode] ["," tunerMode]
screenMode:="fullScreen"|"fullScreenObstructed
    ("obstructedLocation")"|"reducedScreen
    ("preferredLocation")"
obstructedLocation:=location
preferredLocation:=location
location:=
    "top"|"bottom"|"left"|"right"|"topLeft"|"bottomLeft"|
    "bottomRight"|coordinates
coordinates:="xmin,""ymin,""xmax,""ymax"
xmin:=[digit]+
ymin:=[digit]+
xmax:=[digit]+
ymax:=[digit]+
tunerMode:="primaryTuner"|"secondaryTuner"appUri:=
    "url="[alpha|digit]+""
appParameter:="param="[digit|alpha]+
Specific non-limiting examples are as follows:

| Example URI | Reference to: |
| --- | --- |
| tv: | The "current" TV channel or service in the receiver |
| tv:NBC | The frequency for the TV source networkId NBC |
| tv:WATL | The frequency for the TV source with the callLetters WATL |
| tv://ntsc/3 | The frequency associated with the NTSC ID of channel 3 |
| tv.//atsc/vcn/3 | The frequency associated with the ATSC virtual channel number 3 |

-continued

| Example URI | Reference to: |
| --- | --- |
| tv://service/23;env=fullScreen-Obstructed(to pRight) | The SAM 29 service with serviceId 23 owning the full screen but leaving the top right available for another service. |
| tv:NBC;env=reducedScreen-(center),primaryTuner | The NBC network broadcast shown centered on the screen having primary access to the tuner. |
| tv://application/email tv://application/email; url='bfs://apps/email.ptv'; param=209.3.12.5 | The application named email The application named email located at the specified URL, to be activated with the parameter 209.3.12.5 as the IP address of the email server |

If the tuningSpace is "service," then the ID is the service ID of the service that is recognized by the SAM 29. The SAM API (FIG. 2) is used to activate the service given in the ID. If the "tuningSpace" is "channel," then the ID refers to the channel number displayed to the user in the particular "uningSpace" used by the receiver (which is assumed to be known by the receiver). The SAM service ID assigned to the channel can be retrieved via the SAM get service API given the display channel number. Then the SAM API (FIG. 2) is used to activate the service. If "tuningSpace" is atscSpace, then the ID may either be a virtual channel number (VCN) or the source ID to tune. If the "tuningSpace" is "application," then the ID is the name of the application. The application URI and parameter must be specified as part of the parameter list. The SAM API (FIG. 2) is used to activate the application give the URI and the parameter.

"TuningSpace" may also incorporate Phase Alteration Line (PAL), Advanced Television Systems Committee (ATSC), or National Television System Committee (NTSC) standards in the URI scheme. PAL is the analog television display standard that is used in Europe and certain other parts of the world. The ATSC is an international organization that establishes voluntary technical standards for advanced television systems. NTSC is the committee that devised the NTSC television broadcast system in 1953.

Several parameters may be incorporated in the link definition through the "parameterList" syntax. The "parameterList" may define, as described above, the terms of the resource environment ("env") of the service to activate, the application URL ("appURL") which specifies the location of the application to activate, or the application parameter ("appParameter") which represents a specific value to utilize in activating the application.

This URI scheme enables creation of Internet-type hypertext documents that implement television services as objects in the document or for hyperlinks within the documents to the television services. The Internet-type hypertext documents are presented to the user for selection of the hyperlink labels that correspond to the desired television services. Similar to Internet web pages, the HTML content in the Internet-type hypertext documents rendered by the HTML engine 31 may be configured in numerous variations.

Many features are available to the system operator (or even the user) by the HTML (or XML) configuration rendered by the HTML engine 31. For example, the language of the textual display may be defined by the system operator by including the following HTML content in the HTML rendering application: <html lang="language-code">. The "language-code" variable allows the HTML display to be presented in various languages depending on the language code parameter (i.e., English ("en"), French ("fr"), Spanish ("es")), etc. In other words, in at least one embodiment, the user is presented with a plurality of selectable link representations associated with uniform resource identifiers that correspond to a plurality of services, and the selectable link representations are presented in one of a plurality of languages chosen by the system operator of a server device, wherein a language configuration is communicated to the DHCT 16 for implementation in a menu.

The underlying link destinations used to generate the selectable link labels corresponding to the services and applications provided by the DHCT 16 include identification of the particular services, so that when a link label is selected, the HTML engine 31 knows which service or application to activate. A link definition for a selectable link label may be defined by reference to a short description of the service or application. Thus, the HTML syntax <A HREF=) "tv://service/short_description"> would cause the selectable link label to be associated with a target service or application according to the short description assigned or corresponding to the target service. Similarly, the SAM service ID and the actual channel assigned to a desired service may also be used to activate a service or application. The HTML syntax <A HREF="tv://service/ ) decimal_id"> where the "decimal_id" is "10" identifies the SAM service with the service ID that is 10. The HTML syntax, <A HREF="tv://channel/display_channel_number">, where "display$_{channel}$_number" is equal to "3," activates the service on the receiver's channel 3. Tables are maintained in the DHCT 16 which provide for determining the associated channels, services, IDs, descriptions, etc.

The selectable HTML link definition may additionally include information regarding activation of the target service in a specified screen state and location. As a non-limiting example, the selectable link definition <A HREF="tv://channel/32">NBC</A> uses the full screen in tuning to the channel that is assigned to the target service. Thus, upon selection of the link label "NBC" generated from the link definition <A HREF="tv://channel/32">NBC</A> from a middleware application, the service assigned to channel 32 is displayed in the full screen. As an additional non-limiting example, the selectable link <A HREF="tv://service/email">E-mail</A> when activated overlays the email service on top of the underlying application in full screen mode.

Some applications may be configured so that they are presented to the user in only a portion of the display while another service is presented to the user in another portion of the screen display.

A selectable link definition such as <A HREF="tv://service/email;
    env=fullScreenObstructed (location)">E-mail</A> indicates to the HTML engine 31 that the email service is to be activated in full screen obstructed mode and that a current TV program is shown in a reduced location. A user is able to utilize the email service while the DHCT 16 presents a current TV program in a reduced screen portion of the display. Similarly, the selectable link label may also specify activation of the target service in a reduced portion of the screen while retaining the current TV program 59 in the remaining portion of the display. Thus, as a non-limiting example, the HTML syntax <A HREF="tv://service/email;env=reducedScreen(location)"> instructs the HTML engine 31 to execute the email application with its screen reduced to a specified portion of the screen as indicated by the "location" coordinates. The HTML engine 31 instructs the SAM 37 to overlay the email application over the current TV program (or any existing service or application) when the user chooses the E-mail link label. In this manner, the target services may be activated in accordance with the selectable link definitions in the HTML content as configured by the system operator at the headend 11 of the network 20.

In specifying the environment of the service to be activated, the URI scheme also provides for a hierarchy for tuner resources in specifying the "tunerMode." Thus, applications with the "primaryTuner" designation have priority over applications with the "secondaryTuner" designation.

In at least one embodiment, the user is presented with a plurality of selectable link representations with uniform resource identifiers that correspond to a plurality of services, wherein the plurality of selectable link representations are presented in one of a plurality of defined display modes based on a service authorization corresponding to each service of the plurality of services. The display mode for one or more of the selectable link representations is configurable by the user. Alternatively a system operator of a television service device configures the display mode for one or more of the selectable link representations.

In at least one preferred embodiment, an alternative service is activated responsive to a user not being authorized to receive a particular service that corresponds to the user's input, responsive to an alternative service being defined for the otherwise corresponding particular service, and responsive to the display mode being set to an active alternative display mode.

In at least one preferred embodiment, responsive to a user not being authorized to receive a particular service that otherwise corresponds to the user's input, and responsive to the display mode being set to an inactive display mode, the user is presented with a display of one or more of the plurality of selectable link representations in a menu in a grayed-out format denoting an unactivable status.

In at least one embodiment, one or more of the plurality of selectable link representations are omitted from a menu, responsive to the display mode being set to a hidden display mode.

The HTML content rendered by the HTML engine 31, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. Furthermore, any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

What is claimed is:

1. A method for a communication terminal coupled to a display to enable a user to access functionality of a service infrastructure of an interactive television network by a middleware markup language, comprising the steps of:

executing an operating system in the communication terminal;

executing a service application manager (SAM) in the communication terminal, wherein the SAM handles lifecycles of applications in the communication terminal;

presenting a user with a plurality of selectable link representations associated with uniform resource identifiers that correspond to a plurality of services;

receiving user input denoting a selected link representation from one of the plurality of selectable link representations;

translating the uniform resource identifier associated with the selected link representation to an executable call; and activating a service of the plurality of services that corresponds to the selected link representation, wherein the service consists of an application and parameters, and wherein the application abides by resource management policies of the SAM and the operating system of the communication terminal.

2. The method of claim 1, wherein the plurality of services comprises all applications, channels, and services supported by a television server device coupled to the communication terminal.

3. The method of claim 1, wherein the activating step includes execution of a watch TV application.

4. The method of claim 1, wherein the activating step further includes execution of a pay-per-view application.

5. The method of claim 1, wherein the activating step further includes execution of a video-on-demand application.

6. The method of claim 1, wherein the activating step includes execution of a digital music application.

7. The method of claim 1, wherein the activating step includes execution of one or more native applications resident in the communication terminal.

8. The method of claim 1, wherein each selectable link representation of the plurality of selectable link representations corresponds to a link definition that references a service of the plurality of services.

9. The method of claim 8, wherein each link definition is expressed in hypertext markup language (HTML).

10. The method of claim 8, wherein each link definition is expressed in an extensible markup language (XML).

11. The method of claim 1, further comprising the step of:
    presenting the plurality of selectable link representations in one of a plurality of languages chosen by the user.

12. The method of claim 1, further comprising the step of:
    presenting the plurality of selectable link representations in one of a plurality of languages chosen by a system operator of a server device coupled to the communication terminal, wherein a language configuration is communicated to the client device for implementation in a menu.

13. The method of claim 1, wherein the activating step includes activating the service identified by a short description about the service included in the link definition defining the selectable link representation.

14. The method of claim 1, wherein the activating step includes activating the service identified by a service identifier of the service included in the link definition defining the selectable link representation.

15. The method of claim 1, wherein the activating step includes activating a service identified by a channel number for the service included in the link definition defining the selectable link representation.

16. The method of claim 8, wherein the link definition defining the selected link representation specifies a service resource environment of the service referenced by the selected link representation.

17. The method of claim 16, wherein the service activates and utilizes an entire viewable area of the display responsive to the service resource environment defining a full screen mode.

18. The method of claim 16, wherein the service referenced by the selected link representation executes on top of a current channel display responsive to the service resource environment defining a full screen overlay mode.

19. The method of claim 16, wherein the service referenced by the selected link representation executes on a specified portion of the display and a current channel executes in a reduced portion of the display responsive to the service resource environment defining a full screen obstructed mode.

20. The method of claim 8, wherein the service referenced by the selected link representation executes in a reduced portion of the display overlaid on a current channel that executes in the full portion of the display responsive to the service resource environment defining a reduced screen mode.

21. The method of claim 1, wherein the application utilizes and implements the SAM for provisioning, activation, and suspension of services.

22. The method of claim 1, wherein the application handles all situations where resources are unavailable.

23. The method of claim 1, further including the step of:
    suspending the service responsive to loss of service authorization.

24. The method of claim 23, wherein prior to the suspension of the service, the service is being provided, and responsive to the lose of service authorization, the application suspends the service.

25. The method of claim 1, further including the steps of:
reserving predetermined user subscriber input keys for a second application; and configuring the first application such that the first application cannot access the reserved predetermined user subscriber input keys.

26. A method for a communication terminal to enable a user to access functionality of a service infrastructure of an interactive television network by a middleware markup language, comprising the steps of:
presenting a user with a plurality of selectable link representations associated with uniform resource identifiers that correspond to a plurality of services; wherein the plurality of selectable link representations are presented in one of a plurality of defined display modes based on a service authorization corresponding to each service of the plurality of services;
receiving a user input denoting a selected link representation of the plurality of selectable link representations;
translating the uniform resource identifier associated with the selected link representation to an executable call; and
activating a service responsive to receiving the user input.

27. The method of claim 26, wherein the display mode for one or more of the selectable link representations is configurable by the user.

28. The method of claim 26, wherein a system operator of a server device coupled to the communication terminal configures the display mode for one or more of the selectable link representations.

29. The method of claims 26, wherein the activating step includes activating an alternative service responsive to the user not being authorized to receive a service that otherwise corresponds to the user input, responsive to an alternative service being defined for the otherwise corresponding service, and responsive to the display mode being set to an active alternative display mode.

30. The method of claim 26, wherein the presenting step includes displaying one or more of the plurality of selectable link representations in a menu in a grayed-out format denoting an unactivatable status responsive to the user not being authorized to receive a service that otherwise corresponds to the user input, and responsive to the display mode being set to an inactive display mode.

31. The method of claim 26, wherein the presenting step omits from the menu one or more of the plurality of selectable link representations, responsive to the display mode being set to a hidden display mode.

* * * * *

UNITED STATES PATENT AND TRADEMARK OFFICE
CERTIFICATE OF CORRECTION

PATENT NO. : 6,738,982 B1
DATED : May 18, 2004
INVENTOR(S) : Jerding

It is certified that error appears in the above-identified patent and that said Letters Patent is hereby corrected as shown below:

Column 3,
Line 48, delete "aplication." and insert therefore, -- application --.

Column 5,
Line 1, delete "user" and insert therefore, -- user's --.
Lines 50-51, move "appUri:=""" to next line and correct to read as follows:
-- appUrl: = "url=" [alpha|digit]+" --
Line 53, move the line "Specific non-limiting examples are as follows:" to Column 5, Line 56, to be listed before the table "Example URI".

Column 6,
Line 22, delete "uningSpace" and insert therefore -- "tuningSpace" --.

Column 7,
Line 27, delete "display$_{channel}$_number" and insert therefore --
"display_channel_number" --.

Column 12,
Line 5, delete "claims" and insert therefore -- claim --.

Signed and Sealed this

Twenty-seventh Day of July, 2004

JON W. DUDAS
*Acting Director of the United States Patent and Trademark Office*